Sept. 25, 1945.　　　　　L. FRANKEL　　　　　2,385,353
FILM SPLICER
Filed March 1, 1941　　　2 Sheets-Sheet 1

INVENTOR.
Leo Frankel.
BY McLaughlin & Wallenstein
Attorneys

Sept. 25, 1945.   L. FRANKEL   2,385,353
FILM SPLICER
Filed March 1, 1941   2 Sheets-Sheet 2
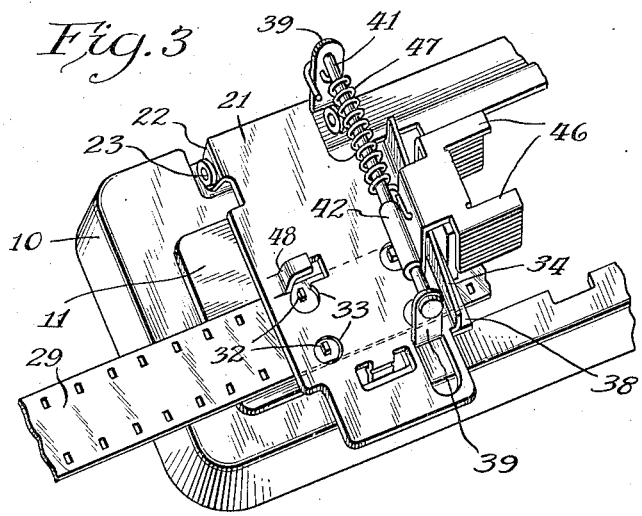
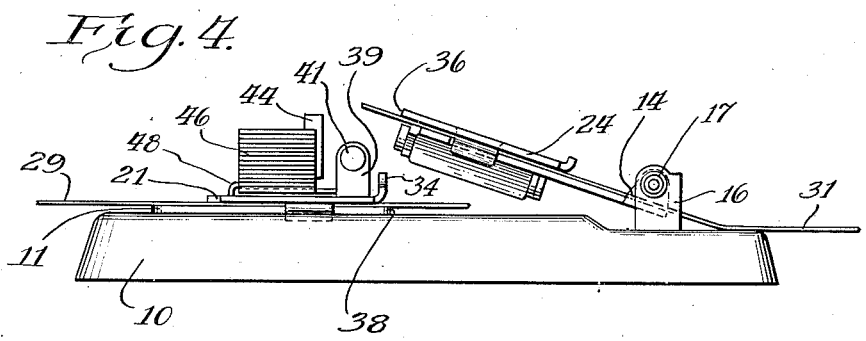
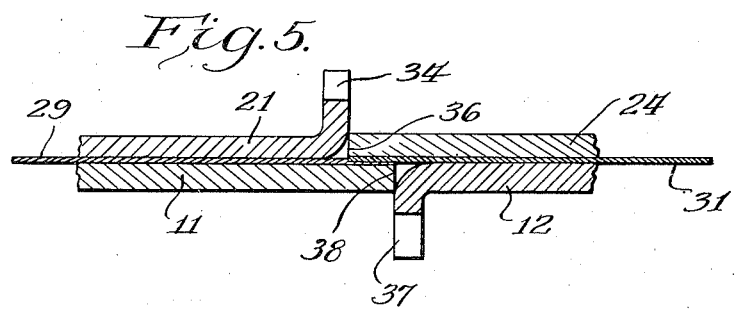
INVENTOR.
Leo Frankel.
BY McLaughlin & Wallenstein
Attorneys Patented Sept. 25, 1945

2,385,353

UNITED STATES PATENT OFFICE 2,385,353

FILM SPLICER

Leo Frankel, Chicago, Ill., assignor, by mesne assignments, to Franklin Photographic Industries, a limited partnership Application March 1, 1941, Serial No. 381,255

7 Claims. (Cl. 154—42)

My invention relates to apparatus for splicing, trimming and scraping film preparatory to cementing ends thereof together, which apparatus, in the industry, is conventionally referred to as a splicer.

The principal object of my invention is the provision of an improved splicer.

Another object is to produce a splicer which can be manufactured and sold at a relatively low price but which will function to perform the various operations required, at least as satisfactorily as much more expensive pieces of equipment.

Still another object is the provision of a splicer which will perform all of the necessary operations in joining two ends of film with only a minimum expenditure of time.

A further object is the provision of a splicer wherein the amount of time involved in bringing the ends of the film together after the cementing operation is exceedingly short whereby there is no opportunity for the cement to dry before the films are joined, and a permanent splice will be obtained.

Still a further object is the provision of a splicer having an improved and compact arrangement with respect to the film trimming, scraping and joining portions of the apparatus.

Other specific objects and features of the invention will be apparent from a consideration of the following detailed description, taken with the accompanying drawings, wherein Fig. 1 is a perspective view of a splicer made in accordance with my invention, the parts being in the position which they assume at the start of a splicing operation;

Fig. 3 is a fragmentary perspective view showing the position which the scraper assembly assumes during the scraping operation;

Fig. 4 is a front elevational view showing the position of the parts just before the completion of the final operation; and Fig. 5 is an enlarged sectional view taken longitudinally of the film and through the shearing blades showing the manner in which the film is cut and held together.

In accordance with the main features of the invention, I provide a base or frame member having two film holding assemblies normally occupying adjacent positions, but one of such film holding assemblies being hinged to the base or frame member so that it may be swung away from the other film holding assembly. Each film holding assembly is provided with a hinged clamping plate by means of which a section of film is held in position. The film holding assembly which is stationary on the frame or base member carries a scraper by means of which one film end may be scraped when the film holding assembly hinged to the base member is swung out of position. The scraper is hinged or mounted on a bar or rod running transversely of the film, and is spring pressed to move it so as normally to bring the abrading portion of the scraper in a direction to permit it to engage the film. Latching means, which may be associated with or form a part of the clamping plate, serves to hold the scraper out of contact with the film, the spring means being operatively connected to the scraper and tending to move it longitudinally of the axis of the bar so as to hold it in engagement under the latching means. Each of the film holding assemblies is provided with a straight edge and a shearing member, the shearing member of one cooperating with the straight edge of the other, and the mutually cooperating shearing members and straight edges being spaced from each other a distance equal to the width of the splice, the parts being so constructed and arranged that the ends of both film sections are trimmed as the hinged film holding assembly is swung on its pivot into horizontal position.

Figure 2:
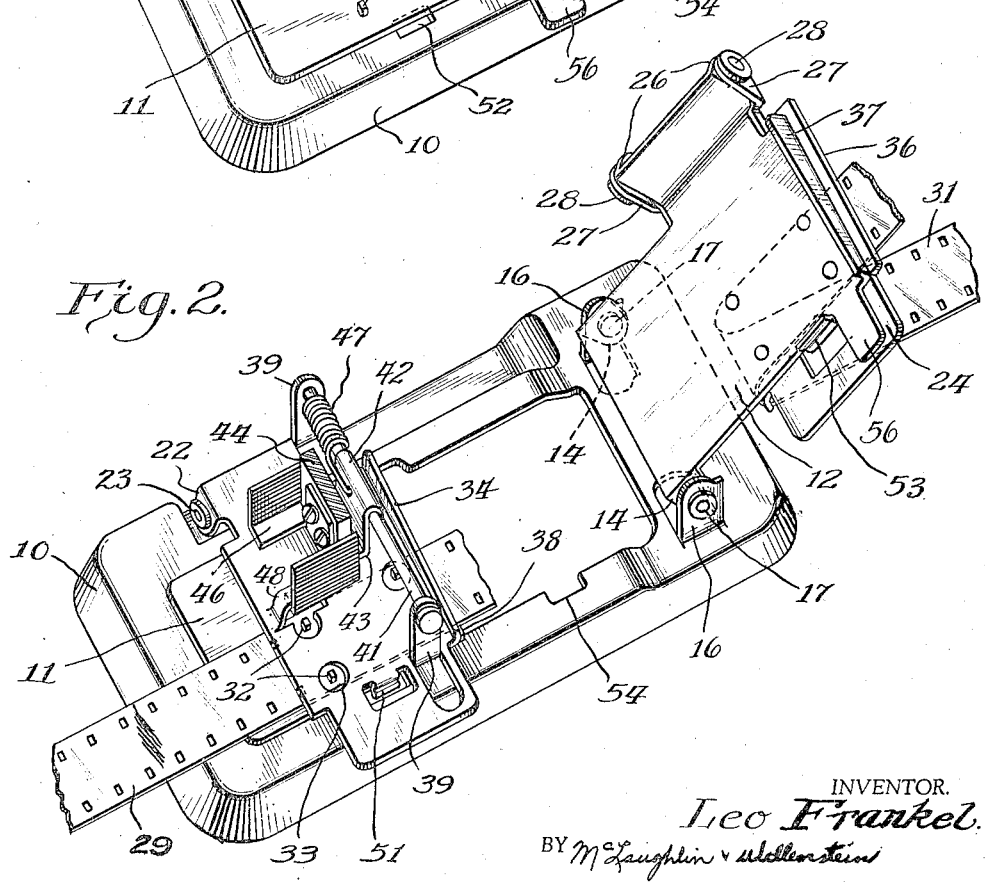
Fig. 2 is a perspective view taken from the same angle as Fig. 1 but with the parts in the position which they occupy just before the final operation of trimming and splicing the film.

Referring now to the drawings, the illustrative embodiment there shown comprises a base 10 which may be suitably formed by a stamping operation, although other means of fabrication may be employed. Secured to the base 10 are base plates 11 and 12 of film holding assemblies, the former being rigidly secured to the base as by screws or rivets 13. The base plate 11 is, therefore, fixed and immovable on the base. The base plate 12 is provided with a pair of upstanding ears 14 which lie adjacent upstanding ears or hinge pieces 16 struck up from the material of the base 10 or otherwise suitably provided for the intended purpose. Rivets 17, extending through the ears 14 and hinge pieces 16, act as pivots around which the entire film holding assembly, of which the base plate 12 forms a part, may be swung away from the base 10 as shown in Figs. 2 and 4.

The base plate 11 has a downwardly sloping portion 18 which lies in a recessed portion of the base 10 and is provided with extending hinge pieces 19 for attachment of a shearing and clamping plate 21. The shearing and clamping plate 21 has a pair of ears 22, and rivets 23, extending through the hinge pieces 19 and ears 22, pivotally mount the shearing and clamping plate 21 in position so that it may be swung away from the base plate 11 or to a horizontal position where it will lie in face-to-face relation therewith.

The base plate 12 in a similar manner carries a shearing and clamping plate 24. The ears through which the pivotal connection is made are shown at 26, the hinge pieces forming a part of the base plate 12 are shown at 27, and the rivets pivotally securing them together are shown at 28.

Thus it will be seen that the film holding assemblies are adapted to support sections of film 29 and 31, the ends of which are to be spliced, these films being held or clamped between base plate 11 and shearing and clamping plate 21 as in the case of the film section 29 and between the base plate 12 and shearing and clamping plate 24 in the case of the film 31. The film, as shown, is provided with the usual marginal perforations, and positioning projections 32 are provided on both of the base plates, these projections extending through the marginal perforations and holding the film in accurate position with the two sections in alignment. The positioning projections 32 may comprise pins inserted in the base plates, or they may be formed from the material of the base plates by a suitable tooling operation, if desired. Openings 33 are provided in the shearing and clamping plates to accommodate the positioning projections 32, it being understood that the material may be entirely removed to leave the holes 33 or merely formed up to to provide a recess for the reception of such projections.

As previously noted, the splicer of my invention functions to shear the two ends of the two pieces of film at the same time, and to this end I provide mutually cooperating shearing means on the two film holding assemblies. The shearing and clamping plate 21 has one edge formed up at substantially right angles to its body to provide a shearing member 34 adapted to cooperate with a straight edge 36 on the shearing and clamping plate 24. The shearing member 34 is triangular so that, when the film is engaged between the resulting top angular edge and the straight edge 36, there is a true shearing action starting at one edge of the film and progressing to the opposite edge, very similar to that of an ordinary pair of shears. The base plate 12 is similarly formed to provide a shearing member 37 adapted to cooperate with a straight edge 38 on the base plate 11 to perform a similar shearing function of the other section of film. It will be noted also that the shearing member 34 is spaced from the straight edge 38 in a direction running longitudinally of the film, and a corresponding space is provided between the shearing member 37 and the straight edge 36. The film 29 is cut by the shearing member 37 cooperating with the straight edge 38 while the film 31 is cut by the shearing member 34 cooperating with the straight edge 36. This leaves the ends of the films, after the cutting operation, in overlapping relation as may be clearly seen from a study of Figs. 4 and 5.

It is a common practice when operating with photographic film to scrape the emulsion from that portion of the film where the splice is to be made, and, while this may be done by hand by means of a separate scraping tool, I have found that the necessary operations of splicing two sections of film together may be carried out to greater advantage by the utilization of a scraper formed as a part of the splicer and functioning with it in the performance of the necessary splicing functions. The scraper, as shown, is adapted to remove the emulsion only from that portion of the film 29 which is in overlapping relation with the film 31 after the two ends have been simultaneously cut in the manner pointed out.

A pair of mounting tabs 39 extend upwardly from the shearing and clamping plate 21 and carry a small rod or bar 41 on which the scraper, in the illustrative embodiment here shown, is mounted. The scraper has a cylindrical portion 42 which fits around the rod 41 snugly but not sufficiently tightly to prevent free movement thereon. The cylindrical portion is part of a generally U-shaped member 43 which carries an abrading member 44, which may be a separately formed member having one edge finished as a file or rasp, and on opposite sides of the scraper 44 right angular finger grip portions 46. Conveniently the portions 46 may be part of the same piece comprising the U-shaped member 43, this being the construction illustrated in the drawings. A coil spring 47 has one end secured to the mounting tab 39 and the other end secured to the U-shaped member 43, the tension in the spring being such that the scraper assembly normally is urged pivotally around the rod 41 in a direction to cause the abrading member to engage the film longitudinally of the rod 41. The spring, in other words, is under tension in the position shown in Fig. 3, but, if the scraper in the position shown in Fig. 3 were released, its only movement would be longitudinally of the rod 41. To hold the scraper in inoperative position, against the action of the spring, as shown in Fig. 2, I provide a locking tab 48 under which the horizontal portion of one of the angular portions 46 is engaged. Since the spring tends to move the scraper longitudinally of the rod 41 when the scraper is in the position shown in Fig. 2, the spring will hold the scraper in contact with the locking tab 48. The locking tab also prevents the scraper from rotating under action of the spring around the rod 41. In use, the scraper is in the position shown in Fig. 3, it being necessary only to move it back and forth across the film to remove the emulsion from the portion of the film 29 which is to be part of the splice, it being understood, of course, that the film sections are mounted in the splicer with the emulsion side up.

Another function of the splicer of my invention is to hold the film sections together after the cement has been applied and during the time necessary for the cement to dry. The shearing and clamping plate 21 is held in position by providing a latching tab 51 which may be formed from the material of the said shearing and clamping plate by a suitable tooling operation, which latching tab engages over the edge of the base plate 11 in such a manner as to hold the shearing and clamping plate tightly against the base plate 11, thereby securely clamping the film section 29 in position. It will be noted that a portion of the base 10 is recessed at 52 to provide an opening into which the latching tab 51 may extend. It will be noted also that the shearing and clamping plate 21 overlaps the base 10 slightly so that the edge thereof is readily available for engagement by the fingers to release it and move it to an open position to withdraw the film.

The shearing and clamping plate 24 is provided with a similar latching tab 53 which engages over the edge of the base plate 12 and extends into a recess 54 provided at the proper position in the base 10. The shearing and clamping plate 24 also overlaps the base 10 so that it may be grasped readily with the fingers to move it upwardly about its pivots. A projection or extending tab 56 on the base plate 12 extends slightly beyond the edge of the shearing and clamping plate 24 as shown at the right hand side of Fig. 2. The projection 56 is spaced substantially the maximum distance from the rivets 17, and is sufficiently narrow so that it does not prevent free access to the front edge of the shearing and clamping plate 24. Thus, it will be noted that the three hinged members may be so constructed and arranged as to be held tightly in film clamping position, but they are readily swung on their respective pivots due to the fact that, in each instance, the member may be engaged with the fingers at substantially the maximum distance away from the pivot. This provides for easy operation. In addition, the projection 56 serves to facilitate lifting of the shearing and clamping plate 24 while holding the base plate 12 against movement, thereby insuring against accidental breaking of a splice should there otherwise be any tendency for the base plate 12 to be moved when the shearing and clamping plate 24 is raised after a splicing operation has been completed.

Figure 1:
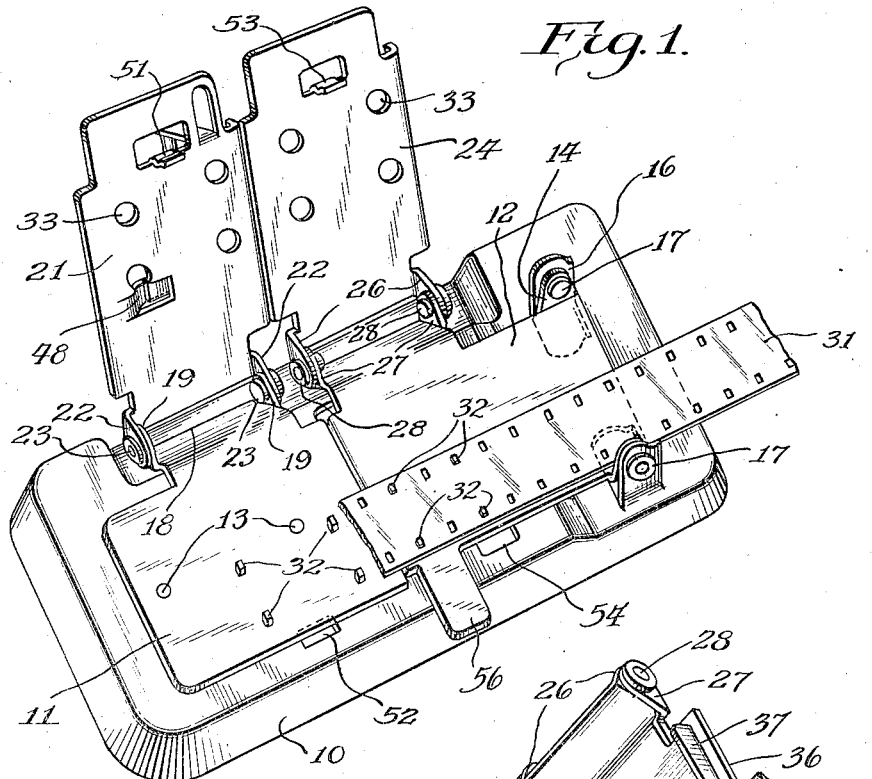

While the device of my invention may take different forms, I have found that the form specifically shown and described in detail has the advantage of being simply and inexpensively made and very easily and quickly operated by any amateur. In making a splice, the following operations are performed:

At the start, the two shearing and clamping plates 21 and 24 are raised to the position shown in Fig. 1, and the film is mounted in position on the base plate 12, with the emulsion side up, for example, as shown in Fig. 1. In this connection, it should be noted that the device may be built to accommodate various sizes of film, a desirable arrangement being to provide for 8 mm. film, 16 mm. film and 16 mm. film with a sound track. When the film section 31 has been placed in position, as shown, the shearing and clamping plate 24 is pressed downwardly until the latching tab 53 is engaged, thereby holding the film section tightly in position. The film holder assembly, comprising the base plate 12 and shearing and clamping plate 24, is then swung bodily around its pivots until it occupies the position shown in Fig. 2, the projection 56 being grasped with the thumb or finger for the purpose. The film section 29 is then placed in position with the emulsion side up, and the shearing and clamping plate 21 lowered to clamp the film. The parts are then in the position shown in Fig. 2. In this position, it will be noted that the torn ends of the film sections project beyond the cutting zones, and the ends remain untrimmed or uncut. The next operation is to release the scraper, grasp it with the thumb and fingers when it is in the position shown in Fig. 3, and rub it across the film section 29 so that the abrading surface thereof in contact with the film will remove the emulsion. If desired, the emulsion may be moistened slightly to facilitate its removal. When the emulsion has been removed, the scraper is returned to its inoperative position, and cement is applied to the portion of the film from which the emulsion was removed. The film holding assembly, comprising the base plate 12 and shearing and clamping plate 24, is then swung to a horizontal position through the position shown in Fig. 4 and finally to the position shown in enlarged fragmentary section in Fig. 5. Both ends of the film are cut by the mutually cooperating shear members and cutting edges previously described and, as the film is cut, the two overlapping ends are brought together with the thin layer of cement between them, and are held in this position without further attention from the operator. It will be seen by examining Fig. 5 that the pairs of mutually cooperating members comprising the base members and shearing and clamping plates of the film holders having a close sliding fit also have a clamping action so that the film holder carrying the film section 31 is held securely in horizontal position and the two film ends are tightly clamped together.

One of the very great advantages of the splicer of my invention is the simple and rapid operations which it performs. Cement used for splicing motion picture film dries very rapidly, and, unless the film ends can be brought together very quickly after the cement has been applied, a poor splice is often made because the surface may dry before the film has been brought together. The number of distinct movements or operations which must be performed to effect a complete splicing operation is the minimum, and the film ends may be brought together in truly aligned position almost instantly after the application of the cement. The film holding assembly, comprising the base plate 12 and clamping plate 24, is supported on a fixed pivot with respect to the fixed film holding assembly, so that the two pairs of cutting members operate as a mere incident to moving the pivoted film holding assembly to horizontal position. The cooperating cutting members are adjusted so that they meet the straight edges in cutting relation. Adjustment may be made by adjusting the position of the relatively fixed film holding assembly toward or away from the pivoted film holding assembly, or by bending either one or both of the cutting members 34 and 37 toward or away from the straight edges with which they cooperate. The construction and support of the scraper has several distinct advantages. The scraper is normally urged by the spring to pivot or rock toward the exposed portion of the film where the splice occurs, and also axially of the rod 41. This axial movement serves to hold the scraper in inoperative position by means of the latch 48, but, to release it from engagement by the latch, it is necessary merely to draw it away from operative engagement with said latch. When free of the latch it rocks about the axis of the rod, but will not strike the film to mar or deface it. The scraper is latched in an inoperative position by rocking against the action of the spring and allowing the spring to carry it into engagement with the latch.

I do not wish to limit my invention to the details shown and described except in so far as such details are included within the scope of the appended claims.

What I claim as new and desire to protect by Letters Patent of the United States is:

1. A film splicer comprising a pair of film holding assemblies, each including a base plate and a clamping plate, a rod supported on one clamping plate transversely of a film held thereby, a film scraper mounted on said rod and having a film abrading portion positioned to engage an exposed portion of a film near the clamping plate, a spring disposed between the scraper and clamping plate tensioned normally to rock said scraper toward the said exposed portion of film into scraping position and bodily along the axis of the rod, and latch means on the clamping plate for preventing rocking of the scraper toward said exposed portion of film when the scraper is not in use.

2. A film splicer comprising a film holding assembly including a base plate and a clamping plate, a rod supported on said clamping plate transversely of a film held thereby, a scraper mounted on said rod and having a film abrading portion positioned to engage an exposed portion of film near the clamping plate, a spring disposed between the scraper and clamping plate tensioned normally to rock said scraper toward the said exposed portion of film into scraping position and bodily along the axis of the rod, and latch means on the clamping plate for preventing rocking of the scraper toward said exposed portion of film when the scraper is not in use.

3. A film splicer including a film holding assembly comprising a base plate and a cooperating clamping plate, a scraper supported on and movable axially of a pivot carried by said clamping plate, a spring normally urging said scraper about its pivot into film scraping position toward an exposed portion of the film extending from beneath said clamping plate, and latch means carried by the said clamping plate for engaging the scraper to prevent its being rocked about its pivot by said spring when the scraper is not in use.

4. A film splicer including a film holding assembly comprising a base plate and a clamping plate, a rod supported transversely of a film held in position within said film holding assembly, a film scraper mounted on said rod and having a film abrading portion positioned to engage an exposed portion of a film near the clamping plate, a spring disposed around said rod and operatively attached to said scraper, said spring being tensioned normally to rock said scraper toward the said exposed portion of film into scraping position and bodily in a direction along the axis of the rod, and latch means for preventing rocking of the scraper toward said exposed portion of film when the scraper is not in use.

5. A film splicer comprising a pair of film holding assemblies, each including a base plate, and a clamping plate, a rod supported transversely of a film held within the film holding assemblies, a scraper attached to said rod and having a film abrading portion positioned to engage an exposed portion of film extending from between one of the base plates and its cooperating clamping plate, a spring cooperating with the scraper tensioned normally to rock said rod and scraper toward the said exposed portion of film into scraping position and longitudinally of the axis of the rod, and latch means for preventing rocking of the scraper toward said exposed portion of film when the scraper is not in use.

6. A film splicer including a film holding assembly comprising a base plate and a cooperating clamping plate, said base plate being provided with a straight edge, a rod carried by said clamping plate, said rod being parallel to said straight edge, a scraper mounted on said rod and bodily movable longitudinally of the axis thereof, a spring coiled around said rod and engaging said scraper normally to move it axially of the rod and concomitantly rock it toward an exposed portion of film into scraping position, and means carried by the said clamping plate for preventing such rocking motion of the scraper when the scraper is not in use.

7. A film splicer including a film holding assembly comprising a base plate and a cooperating clamping plate, said base plate being provided with a straight edge, a rod carried by said clamping plate, said rod being parallel to said straight edge, a scraper mounted on said rod and bodily movable along the axis thereof, a spring coiled around said rod and engaging said scraper normally to rock it toward an exposed portion of film into film scraping position and also to move it axially of the rod, and means carried by said clamping plate for preventing such rocking motion of the scraper when the latter is not in use, said means comprising a lug projecting upwardly from the clamping plate, the scraper having a portion held in engagement under said lug by the axial movement of the scraper by said spring.

LEO FRANKEL.